Oct. 31, 1967    W. A. MINIX    3,349,605
PRECISION PNEUMATIC RELAY
Filed Dec. 16, 1965    2 Sheets-Sheet 2

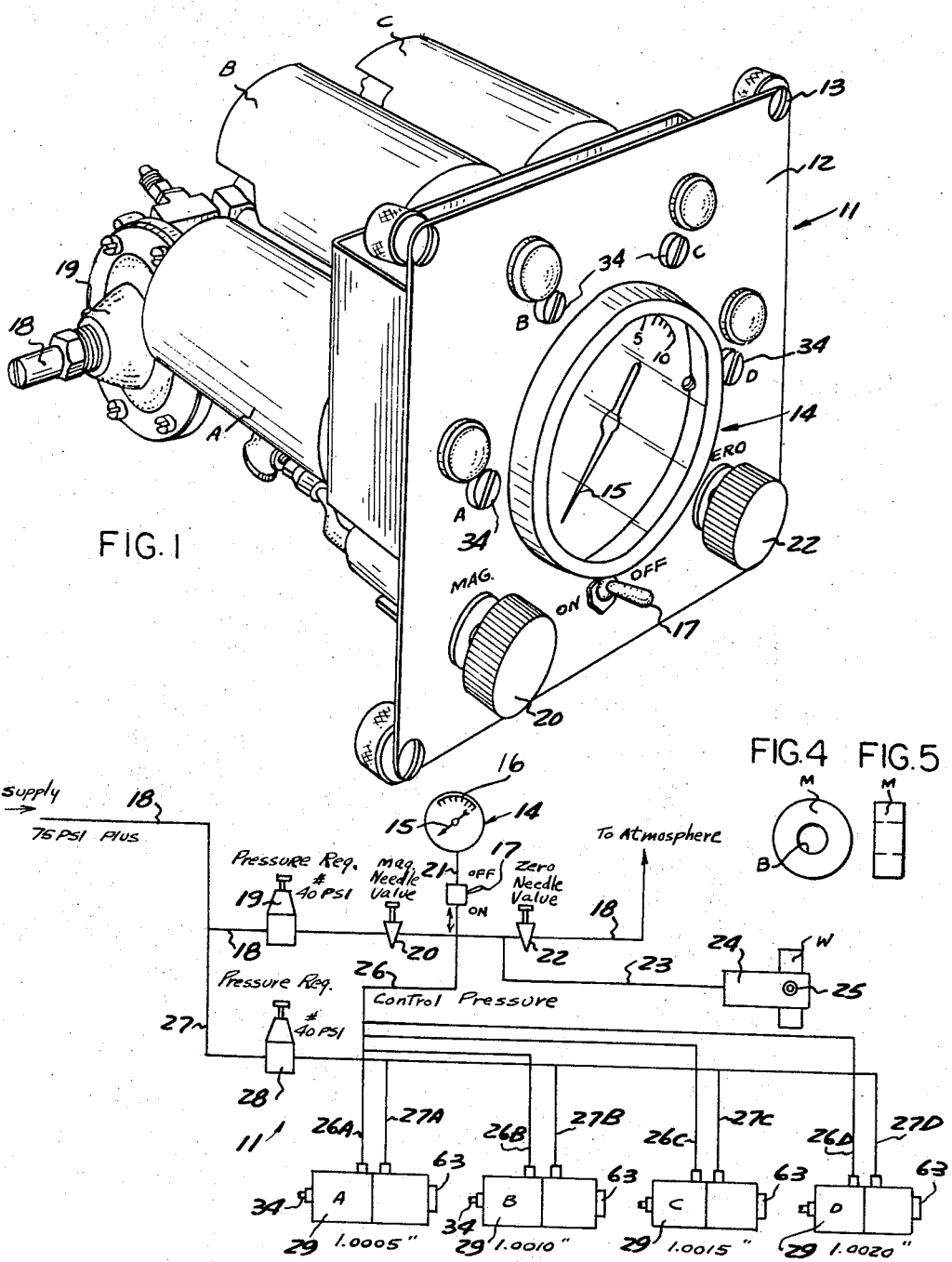

INVENTOR
WILLIAM A. MINIX
BY Cullen, Sloman & Cantor
ATTORNEYS

United States Patent Office 3,349,605
Patented Oct. 31, 1967

3,349,605
PRECISION PNEUMATIC RELAY
William A. Minix, Detroit, Mich., assignor to Freeland Gauge Company, Detroit, Mich.
Filed Dec. 16, 1965, Ser. No. 514,322
The portion of the term of the patent subsequent to Dec. 21, 1982, has been disclaimed
1 Claim. (Cl. 73—37.9)

ABSTRACT OF THE DISCLOSURE

An air gauge in the form of a precision pneumatic relay for the selective gauging of machined parts as variables in a "go range," employing a variably reactive control air pressure determined by the extent of air bleeding during gauging of a part to selectively activate one of a plurality of pressure variably responsive valves corresponding to predetermined "go range increments" to activate a respective servile motor corresponding to each valve for a corresponding sorting mechanism.

This patent application is a continuation-in-part of my co-pending patent application on an Air Gauge Control, Ser. No. 413,683, filed Nov. 25, 1964, now United States Letters Patent No. 3,224,251.

The present invention relates to air flow gauging devices for gauging the bore of a part and wherein air leakage from a gauge head within said bore is visibly measured and compared with air leakage from said gauge head within a series of predetermined master bores to provide a range for the selection or rejection of work pieces.

More particularly the present invention is directed to a pneumatic control for the automatic sorting of selected parts corresponding to the master bores in the selected range and wherein automatic control means are activated depending upon a variable reactive intermittent control air pressure in the line to the gauge head for energizing one of a series of control mechanisms for operating a sorting device.

It is an object of the present invention to provide pneumatic control mechanism for activating a limit switch connected to one of a plurality of sorting mechanisms. The control device is accurately adjusted so as to respond to a reactive variable intermittent control air pressure from a gauging element in a selective manner whereby a particular control element will not fire unless the gauged part has a measurement within a predetermined tolerance corresponding to one of a plurality of master bores within an approved range.

It is an object of the invention to provide a series of control elements employed in conjunction with gauging apparatus with each of the control elements separately adjusted so as to respond only upon application of a variable control pressure corresponding to the range of tolerance for a particular one of several master gauge bores.

It is another object to provide a pneumatic control mechanism which incorporates an operating chamber with an air pressure responsive flexible movable diaphragm for actuating the plunger of a limit switch; and a second control chamber mounting a second air pressure responsive movable diaphragm for actuating a normally seated valve for permitting the flow of air under a constant pressure to said operating chamber. The control chamber diaphragm is initially biased so as to be in balance with a constant source of pressure. The variable control reactive pressure from the gauge element is connected to the control chamber for operation in conjunction with the second diaphragm bias providing an upset of said balance and momentary unseating of the control valve.

New object

It is another object to provide a hydraulic valve for controlling the flow of fluid or liquid from a pressure source to a motor or other device for regulating a control movement, said valve including a reciprocal valve element interposed between said operating chamber diaphragm and the plunger of said limit switch, movement of said valve element controlling both said valve and said limit switch.

These and other objects will be seen from the following specification and claims in conjunction with the appended drawings in which:

FIG. 1 is a front perspective view of the present pneumatic control apparatus incorporating an air gauge assembly and a series of control elements.

FIG. 2 is a schematic diagram of the pneumatic connections between the gauge apparatus and the control elements.

FIG. 4 is a front elevational view of a master which is one of a series employed.

FIG. 5 is a side elevational view thereof.

Figure 3:
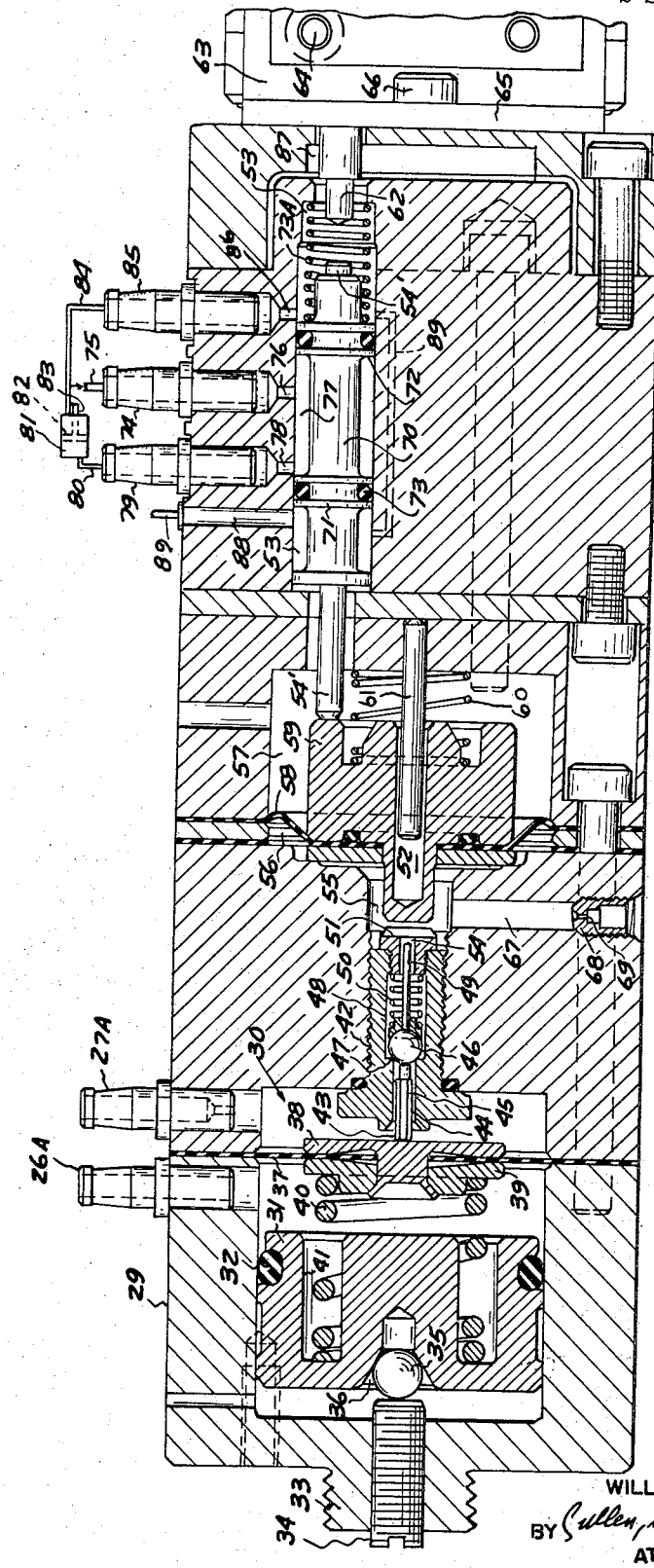
FIG. 3 is a longitudinal section on an enlarged scale of one of the control elements.

Referring to the drawing, the present air gauge control apparatus 11, FIG. 1, includes a support plate 12 with mounting fasteners 13.

The gauge has an air pressure dial indicator 14 with needle 15 responsively movable relative to calibrations 16, and a manual off and on switch 17 for controlling communication of air under pressure from conduits 18 and 21 to indicator 14.

Referring to FIG. 2, a supply of air is delivered to conduit 18 at, for illustration, 75 p.s.i. for connection with pressure regulator 19, which in the illustrative embodiment is set at 40 p.s.i., for delivering a constant flow of air under pressure through magnification needle valve 20 regulating flow of air to conduit 21, and to the zero air bleed control needle valve 22 and thence to atmosphere. In air line 18 between valves 20 and 22 there is connected an air delivery conduit 23 which joins gauge head 24 having orifices 25 adapted for registry with the bore of a work piece W. A ring master M is shown in FIGS. 4 and 5, being one of several in a predetermined tolerance range. Each includes a bore B for comparison with the bore of work piece W.

In the normal operation of air leakage gauges of the type shown in FIG. 2, air leakage from gauge head 24 within the bore of work piece W is visibly measured and compared with air leakage from said gauge head 24 within a series of predetermined master bores of a series of masters M. This provides a range for the selection or rejection of work pieces employing, for illustration, four ring masters indicating a "go" range of acceptable bores. These masters will have diameters, for example, of 1.0005 inches; 1.0010 inches; 1.0015 inches and 1.0020 inches, FIG. 2. This indicates, for example, the full range of acceptable bores for work pieces outside of which the work piece is rejected.

The amount of air bleeding from head 24 within work piece W in or out of the acceptable range will depend upon the bore tested. This bleeding will vary and will provide in air lines 18 and 23 an intermittent variable reaction control air pressure. This control pressure is used for the actuation of one of a series of pneumatic control elements A, B, C, D depending upon its setting so as to respond to air pressure to cause firing or activation of the particular pneumatic control element. These respective control elements are indicated at A, B, C, and D, FIG. 2. A separate conduit 26A, 26B, 26C, and 26D joins line 26 and connects the main air line 18 in communication with the air pressure indicator 14. There is, thus, transmitted respectively to each of the control elements A, B, C, and D the variable reactive intermittent air control pressure in line 18 provided by the amount of air leakage at head 24.

Due to the different setting of each of the control elements A, B, C, and D, only one thereof will be activated or "fire" for actuating one of a series of sorting devices. This is accomplished, for illustration by an electrical control such as a limit switch which actuates a solenoid, for example, and which controls the operation of a gate. Thus, a gauged part goes in one direction or another and is, thus, sorted, since there are normally a series of such gates, operated selectively by the respective control mechanism A, B, C, and D. Thus the part corresponding to the particular range defined by the masters possibly all within the "go" area can be separately sorted according to their correspondence with a particular master bore. Thus, this variable control pressure is transmitted through the respective branches 26A, 26B, 26C, and 26D to each of the control chambers 30 of the control elements, FIG. 3.

Each of the control elements A, B, C, and D have a housing 29, provided with a source of air under constant pressure. Line 27 from main air line 18, FIG. 2 connects pressure regulator 28 set for illustration at 40 p.s.i., and through the respective branches 27A, 27B, 27C, and 27D delivers constant air pressure to the respective control chambers 30, FIG. 3.

Since the variable reactive pressure in line 23 will vary depending upon the size of the work piece bore with respect to the series of masters, this variable control pressure will be transmitted back through line 26 to each of the control chambers of the series of control devices 29. However, due to the setting of the initial bias upon the diaphragm 37 within control chamber 30, only one of the four control elements will respond to operate an electrical device.

These control elements 29 are individually mounted upon the rear surface of support 12, FIG. 1, to provide a complete unit. One of the said control elements is described with respect to FIG. 3.

*Pneumatic control element*

The present control element includes housing 29 having adjacent one end control chamber 30 with the longitudinally adjustable piston 31 sealed therein at 32. Mounting boss 33 has a threaded bore to receive manually adjustable screw 34 which projects into the control chamber and operatively engages ball 35 within cone shaped recess 36 upon one side of piston 31 for controlling longitudinal adjustment of said piston.

A flexible axially movable diaphragm 37 of rubber or equivalent is sealed within control chamber 30. Centrally mounted upon said diaphragm is an axially arranged actuator 38 having a central portion which projects through the diaphragm and mounts retainer 39 engaging one end of compression spring 40. The opposite end of said spring is nested and retained within bore 41 of piston 31. Spring 40 provides an initial bias upon one side of diaphragm 37 tending to flex its central portion axially to the right, FIG. 3.

Adjacent the opposite end of housing 29 is an operating chamber 57; and interconnecting chambers 30 and 57 is an axial bore 55.

A normally closed valve assembly is mounted within bore 55 and includes the flanged valve seat 42, a portion of which extends into control chamber 30. The valve seat has an axial bore within which is loosely and movably positioned the control rod 43 which has a series of peripheral elongated flutes 44 defining a series of air passages 45, FIG. 3.

The valve assembly includes ball 46 normally seated at 47 within bore 48. Ball 46 is biased to seated position by headed stem 49 and compression spring 50 upon the interior of said bore preventing the flow of air under pressure through bore 55.

Spring 50 is retained within said bore by retainer screw 51 whose bore 54 provides communication to chamber 56 relative to the transverse flexible diaphragm 58, sealed across operating chamber 57.

Actuator 59 is axially secured to and projects through diaphragm 58 and has a bore 52 which cooperatively receives guide pin 61 anchored to the housing.

Coil spring 60 is mounted around a portion of actuator 59 and at one end bears against housing 29 within control chamber 57 and provides an initial bias to the left of the central portion of diaphragm 58 normally resisting movement of actuator 59 in the opposite direction.

The limit switch or other control switch 63 adapted for connection to any type of sorting mechanism, or a signal system, for illustration, is fastened at 64 to bracket 65, FIG. 3, anchored at 66 upon housing 29. Limit switch 63 includes an actuating plunger 62 which extends through the wall of the housing and into bore 53 and is adapted for operative engagement with stem 54' of valve element 70; and thus responds to flexing movement of diaphragm 58 to the right from the position shown in FIG. 3. Such flexing, through actuator 59 and valve stem 54', actuates plunger 62.

Radial exhaust passage 67 inter-connects one end of bore 55 adjacent diaphragm 58 with the atmosphere. Bleed plug 68 is positioned within passage 67 and includes an air bleed orifice 69 to permit the gradual escape of accumulated air within bore 55.

Referring to FIG. 2 a supply of air under constant pressure, such as 40 p.s.i. is directed through conduits 27A, 27B, 27C and 27D to control chamber 30 upon the side of diaphragm 37 opposite from its biasing spring 40.

In setting up control element A an initial balance is established between the constant air pressure supplied through conduit 27A into chamber 30 and the spring bias applied to said diaphragm from its opposite side through manual adjustment of screw 34.

Said valve includes valve element 70, the axial stem 54 extending from opposite ends, FIG. 3, and a pair of spools 71 and 72 sealed at 73 within bore 53, and bias spring 73A.

Pressure fitting 74 on housing 29 is connected with a source of fluid under pressure as diagrammatically shown at 75, which may be either air under pressure or liquid under pressure for transmission to passage 76 and chamber 77. In the position of valve element 70 in FIG. 3 this pressure fluid moves through passage 78, fitting 79, conduit 80, through one end of the cylinder 81 for effecting movement to the right of the piston 82 therein with the connected rod 83.

Exhaust from cylinder 81, or any other type of motor travels through conduit 84, fitting 85, passage 86, and assuming compressed air is used, could be transferred through passage 87 and thence to atmosphere. Alternately, if a pressure fluid is employed, passage 87 is sealed and the exhaust flow would be through passage 89 shown in dotted lines, FIG. 3, thence through exhaust outlet 88 to a suitable exhaust conduit 89, diagrammatically shown.

Immediately upon firing of the element 29 as hereafter described in detail, diaphragm 58 flexes to the right from the position shown in FIG. 3 and actuator 59 operates the valve stem 54' moving the same axially to the right relative to bore 53 and the opposite end of stem 54' engages plunger 62 to energize the limit switch 63.

At the same time, the pressure flow through passage 76 is cut-off from passage 78 and in turn through bore 53 travels through conduit 86 and through fitting 85 and conduit 84 back to the motor or cylinder 81 for causing movement in the opposite direction of piston 82. Exhaust through conduit 80 returns to the fitting 79 and through passage 78 communicating with bore 53 and thence out through the exhaust passage 88 and the exhaust conduit 89 or to the atmosphere in the case of compressed air.

Thus, the firing of the control element 29 generally speaking causes and controls reciprocal movement of the mechanical device 83, which may be a sorting device.

Operation

In the initial set up of the control element with constant pressure applied to chamber 30, the bias through spring 40 and piston 31 is sufficient to balance diaphragm 37 and actuator 38 to maintain control rod 43 operatively so as not to unseat biased ball 46. By regulating screw 34 and piston 31 the compression and sensitivity of spring 40 may be regulated.

The variable reactive intermittent control air pressure in line 23 is delivered through the conduit 26 or the respective branch conduits 26A, 26B, 26C, and 26D to the side of the diaphragm 37 within control chamber 30 corresponding to its biased side or adjacent spring 40. Upon application intermittently of this variable reactive control pressure to chamber 30 there is created a temporary imbalance upon diaphragm 37 which flexes to the right of FIG. 3 and actuator 38 axially moves control rod 43 to unseat ball 46. For a very short period the air under pressure of 40 p.s.i. in chamber 30 will move through passages 45, through bore of valve seat 42, through bores 48 and 55, into chamber 56, forming a part of operating chamber 57. This causes flexing to the right of diaphragm 58 against spring 60. This causes a corresponding axial movement of actuator 59, and through stem 54' a momentary actuation of plunger 62 of limit switch 63.

Any build up of air within bore 55 escapes through exhaust passage 67 and air bleed plug 68. Just as soon as this variable reactive intermittent control air pressure is relieved from conduit 26A, FIG. 3, the air compressed within chamber 30 will cause diaphragm 37 to flex axially to the left against the action of spring 40 until the diaphragm has assumed the neutral position shown. Ball 46 is again seated closing off further flow of compressed air through bore 55 to control chamber 56.

By adjustment of manual control screw 34 shown in FIG. 1 on support plate 12, a very sensitive balance can be created between the initial bias applied through spring 40 to diaphragm 37, and the constant air pressure in chamber 30 delivered through conduit 27A.

By adjusting screw 34 of control device A, FIGS. 2 and 3, the amount of reactive air pressure through conduit 26A which will be sufficient to overcome the balance of diaphragm 37 in control chamber 30 may be varied. By similarily adjusting all four of the separate control elements A, B, C, and D, it is seen that a variable reactive control pressure of one degree could cause an imbalance of the control diaphragm in control chamber 30, insufficient to create an imbalance in control member A, but sufficient to create an imbalance in control member B in the setup shown in FIG. 2.

Successively then, each of the adjusting screws 34 of the respective control device A, B, C, and D will have a different bias pressure of such sensitivity that only one of the four control mechanisms A, B, C, and D will be activated in the gauging of one particular bore of a part with all the other control devices momentarily rendered ineffective. This provides a device by which even in the "go" range or acceptable range of bores the parts may be sorted since the control mechanism responding to a particular bore and corresponding master will operate only one of the series of limit switches 63 or other switching mechanism 82-83 for operating an individual sorting device electrically.

This is particularly true because the reactive pressure delivered to the conduit 26, namely through any of the branches 26A, 26B, 26C or 26D will vary depending upon the amount of air bleeding which occurs at gauge head 24 in its application to a particular work piece. For example, all the bores may be in the "go" zone or all acceptable. However, activation of the B control unit would indicate a bore corresponding to a master of one 1.0010 inches for sorting in one category whereas actuation of the control device D with a different control pressure because of the increased clearance of head 24 with respect to a work piece bore operates a different control mechanism. That particular work piece as tested would then be mechanically sorted since the present pneumatic control device operates selectively any one of the four limit switches 63, or any one of four control mechanisms 82-83 such as shown in FIG. 3, corresponding to units A, B, C, and D.

Upon support 12 adjacent each of the respective adjusting screws 34 corresponding to the individual control devices A, B, C, and D, FIG. 1, there is a bulb respectively indicated at A, B, C, and D corresponding to and indicating when lighted the actuation of a particular control element A, B, C, or D.

Having described my invention reference should be had to the following claim.

I claim:

In an air gaging system providing a variable reactive intermittent control air pressure responsive in magnitude to the size of a gaged part, the improved part sorting system which comprises:
  a housing;
  a limit switch mounted on said housing for momentarily activating a control element upon actuation of a limit switch plunger;
  a distribution valve assembly in said housing including a first valve element adapted to control the flow of pressurized fluid to a reciprocating sorter for gaged parts, and further adapted to selectively actuate said limit switch plunger;
  said housing having a first chamber within which a first sealed diaphragm is mounted for axial movement, one end of said first valve element being biased away from said plunger and toward and extending into said first chamber and adapted to abut a first side of said first diaphragm for axial movement therewith;
  said housing further having a constant control chamber adapted to be supplied with a constant pressure from a pressure source, and a variable control chamber connected to the variable reactive intermittent control air pressure source;
  said housing further having a bore communicating between said constant control chamber and the second side of said first diaphragm;
  a second valve element movably mounted within said bore and normally biased to a seated bore-closing position;
  a second sealed diaphragm mounted within said housing and separating said constant control chamber from said variable control chamber;
  adjustably biasing means for normally biasing said second diaphragm in balanced opposition to the effect of the pressure in said constant control chamber;
  a control rod guidably mounted within said bore between said second valve element and said second diaphragm;

whereby an air pressure signal above a predetermined magnitude applied to said variable control chamber causes said second diaphragm to displace said control rod to unseat said second valve element, thereby causing constant control pressure to be applied via said bore to said second side of said first diaphragm to axially move said first diaphragm to actuate said first valve element and said limit switch plunger.

References Cited

UNITED STATES PATENTS

| | | | |
|---|---|---|---|
| 3,224,251 | 12/1965 | Minix | 73—37.5 |
| 3,270,774 | 9/1966 | Stuart | 137—625.66 |

LOUIS R. PRINCE, *Primary Examiner.*

WILLIAM HENRY, *Assistant Examiner.*